United States Patent [19]

Nimura et al.

[11] Patent Number: 4,926,076

[45] Date of Patent: * May 15, 1990

[54] ALTERNATOR WITH ATTACHED DIODE REGULATOR HOUSING

[75] Inventors: Takayasu Nimura, Nagoya; Tsutomu Shiga, Nukata, both of Japan

[73] Assignee: Nippondenso Co., Ltd., Kariya, Japan

[*] Notice: The portion of the term of this patent subsequent to Dec. 27, 2005 has been disclaimed.

[21] Appl. No.: 218,571

[22] Filed: Jul. 12, 1988

Related U.S. Application Data

[60] Division of Ser. No. 57,733, Jun. 2, 1987, Pat. No. 4,794,285, which is a continuation of Ser. No. 665,496, Oct. 29, 1984, abandoned, and Ser. No. 213,491, Dec. 5, 1980, abandoned.

[30] Foreign Application Priority Data

Dec. 14, 1979 [JP] Japan ................. 55-162439

[51] Int. Cl.$^5$ ............................. H02K 9/00
[52] U.S. Cl. .................... 310/68 D; 310/58
[58] Field of Search ............. 310/62, 68 D, 89, 254, 310/68 R, 60 R, 61, 263, 90

[56] References Cited

U.S. PATENT DOCUMENTS

| | | |
|---|---|---|
| 876,566 | 1/1908 | Lord . |
| 953,219 | 3/1910 | Muller . |
| 1,668,462 | 5/1928 | Oswald . |
| 2,368,320 | 1/1945 | Nones . |
| 2,429,903 | 10/1947 | Trickey . |
| 2,508,144 | 5/1950 | Carville . |
| 2,819,417 | 1/1958 | Glass . |
| 2,825,827 | 3/1958 | Luenberger . |
| 2,852,711 | 7/1964 | Derner et al. . |
| 3,141,985 | 7/1964 | Martin . |
| 3,184,625 | 5/1965 | Farison . |
| 3,198,972 | 8/1965 | Larson . |
| 3,230,404 | 1/1966 | Graham . |
| 3,253,167 | 5/1966 | Bates et al. . |
| 3,267,312 | 8/1966 | Redick et al. . |
| 3,271,606 | 9/1966 | Collins . |

(List continued on next page.)

FOREIGN PATENT DOCUMENTS

| | | |
|---|---|---|
| 1181118 | 1/1985 | Canada . |
| 540080 | 11/1931 | Fed. Rep. of Germany . |
| 1488653 | 7/1969 | Fed. Rep. of Germany . |
| 1588432 | 5/1970 | Fed. Rep. of Germany . |
| 7100343 | 12/1970 | Fed. Rep. of Germany . |
| 1488566 | 6/1972 | Fed. Rep. of Germany . |
| 2757485 | 6/1978 | Fed. Rep. of Germany . |
| 7833164 | 4/1979 | Fed. Rep. of Germany . |
| 977165 | 3/1951 | France . |
| 47-25812 | 3/1972 | Japan . |
| 47-7791 | 5/1972 | Japan . |
| 47-42264 | 5/1972 | Japan . |

(List continued on next page.)

OTHER PUBLICATIONS

Nippon Denso Technical Disclosure No. 13-071, 1/29/79.
Delco-Remy: Electrical Equipment Brochure, 8/1/67, 1968 Delco-Remy Brochure, 10/1/67, and Automotive Industries, Apr. 1, 1973.
Taschenbuch Elektrotechnik, 1966, vol. 2, Band 2, Starkstromtechnik, pp. 205-206.

*Primary Examiner*—Peter S. Wong
*Assistant Examiner*—D. L. Rebsch
*Attorney, Agent, or Firm*—Cushman, Darby & Cushman

[57] ABSTRACT

An alternator includes a housing having first and second axial end portions with a plurality of air intake ports for permitting air to pass through the axial end portions. The housing also includes first and second air exhaust ports which are spaced from one another. A stator assembly includes a stator core provided on an inner surface of the housing between the air exhaust ports and a stator winding wound around the stator core. A rotor assembly includes a rotor shaft, a rotor core fixed to the rotor shaft, and a rotor coil wound around the rotor core. The rotor shaft is rotatably supported by the axial end portions of the housing. A diode fin and a voltage regulator are disposed around an end of the rotor shaft. A pair of fans are mounted to the end surfaces of the pole cores of the rotor to increase the cooling efficiency of the alternator.

7 Claims, 3 Drawing Sheets

U.S. PATENT DOCUMENTS

| | | | |
|---|---|---|---|
| 3,280,751 | 10/1966 | Ekey . | |
| 3,422,339 | 1/1969 | Baker | 310/68 R |
| 3,445,694 | 5/1969 | Campbell et al. . | |
| 3,463,951 | 8/1969 | Bauerle et al. . | |
| 3,493,800 | 2/1970 | Barrett . | |
| 3,527,970 | 9/1970 | Wightman et al. | 310/254 |
| 3,534,204 | 10/1970 | Groezinger . | |
| 3,538,361 | 11/1970 | Hilterbrick et al. . | |
| 3,548,226 | 12/1970 | Sato . | |
| 3,617,782 | 11/1971 | Nakumura et al. . | |
| 3,628,075 | 12/1971 | Dafler et al. . | |
| 3,643,119 | 2/1972 | Lukens . | |
| 3,739,210 | 6/1973 | Bahlinger et al. . | |
| 3,751,699 | 6/1973 | Gleichman . | |
| 3,935,489 | 1/1976 | Church et al. . | |
| 4,045,698 | 8/1977 | Morrill . | |
| 4,065,685 | 12/1977 | Moore . | |
| 4,075,523 | 2/1978 | Lafferty, Sr. . | |
| 4,087,713 | 5/1978 | Binder . | |
| 4,103,193 | 7/1978 | Ito . | |
| 4,162,419 | 7/1979 | De Angelis | 310/266 |
| 4,169,282 | 9/1979 | Allport et al. . | |
| 4,189,653 | 2/1980 | Hiratuka et al. . | |
| 4,404,487 | 9/1983 | Nimura . | |
| 4,418,295 | 11/1983 | Shiga . | |
| 4,419,597 | 12/1983 | Shiga et al. . | |
| 4,421,948 | 12/1983 | Ahner et al. . | |
| 4,549,103 | 10/1985 | Shiga . | |

FOREIGN PATENT DOCUMENTS

| | | | |
|---|---|---|---|
| 48-12505 | 2/1973 | Japan . | |
| 49-56402 | 5/1974 | Japan . | |
| 50-28617 | 3/1975 | Japan . | |
| 50-62005 | 5/1975 | Japan . | |
| 50-75003 | 6/1975 | Japan . | |
| 52-22128 | 2/1977 | Japan . | |
| 52-156908 | 12/1977 | Japan . | |
| 54-24081 | 4/1979 | Japan . | |
| 54-48917 | 4/1979 | Japan . | |
| 687540 | 10/1979 | U.S.S.R. . | |
| 1113428 | 10/1964 | United Kingdom . | |
| 1088375 | 10/1967 | United Kingdom | 310/68 D |
| 1149856 | 4/1969 | United Kingdom . | |
| 1149857 | 4/1969 | United Kingdom . | |
| 1398859 | 6/1975 | United Kingdom . | |
| 2019109 | 10/1979 | United Kingdom . | |

ALTERNATOR WITH ATTACHED DIODE REGULATOR HOUSING

This application is a Division of U.S. Ser. No. 57,733, filed 2 June 1987, now U.S. Pat. No. 4,794,285, which is a Continuation of Serial Number 665,496, filed 29 Oct. 1989 and Serial Number 213,491, filed 5 Dec. 1980, both now abandoned.

TECHNICAL FIELD

The present invention relates to an alternator with a voltage regulator unit used, for example, in vehicles.

BACKGROUND ART

The rotational speed of the alternator used in vehicles can be increased by using a poly V belt as the driving means. In order to realize such a high speed alternator, it is necessary to make the structure of the generator firm so as to reduce flection of the axis of the generator, to reduce vibrations of the generator, to give the generator an excellent centrifugal force characteristic, and hence to make the generator competent to withstand the high speed rotation. Also, it is necessary to provide an excellent cooling system in which stator windings, rectifiers, a regulator of the integral circuit type, rotor winding and bearings can be cooled in a suitable manner. Further, it is necessary to reduce the noise of the generator when rotating, which noise arises from the friction between the blades of the cooling fan in the generator and the air.

The present invention is directed to improve the structure of the alternator so as to comply with the above described requirements for the high speed rotation of the alternator.

DISCLOSURE OF THE INVENTION

It is the main object of the invention to create a high speed alternator which has increased structural strength, exerts reduced vibration and performs efficient cooling of the heat generating portions of the generator and the associated elements.

In accordance with the present invention, there is provided an alternator comprising a shaft, pole cores of a rotor fixed to said shaft, a rotor winding wound around said pole cores, a stator core arranged around said rotor, a stator winding wound around said stator core and a housing encasing said rotor and said stator, wherein said alternate current generator is characterized in that: said housing consists of a pair of frame pieces which are coupled directly to each other, said stator core is fixed directly to the inside surface of one of said frame pieces, a pair of bearing boxes are arranged in the central portions of said frame pieces inside of said housing form by said pair of frame pieces, a pair of fans are fixed to the end surfaces of said poles cores of said rotor, and; the associated elements including slip rings, brushes, rectifiers and a voltage regulator unit are located outside of said housing formed by said frame pieces.

DESCRIPTION OF THE PREFERRED EMBODIMENTS

Figure 1:
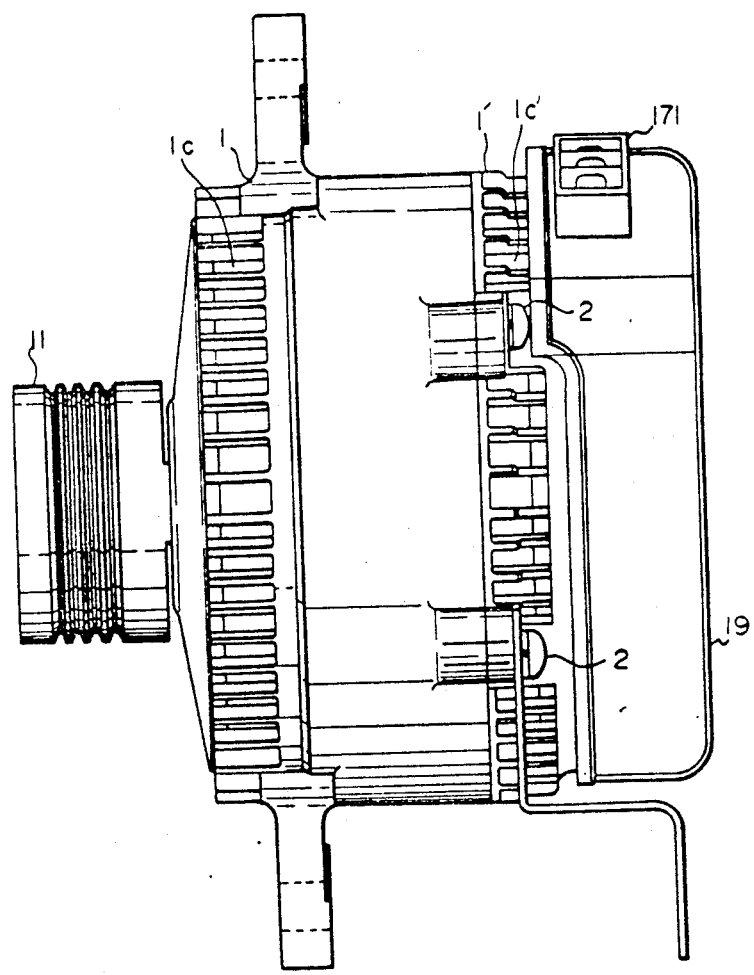
FIG. 1 illustrates an elevational view of the alternator as an embodiment of the present invention.
Figure 2:
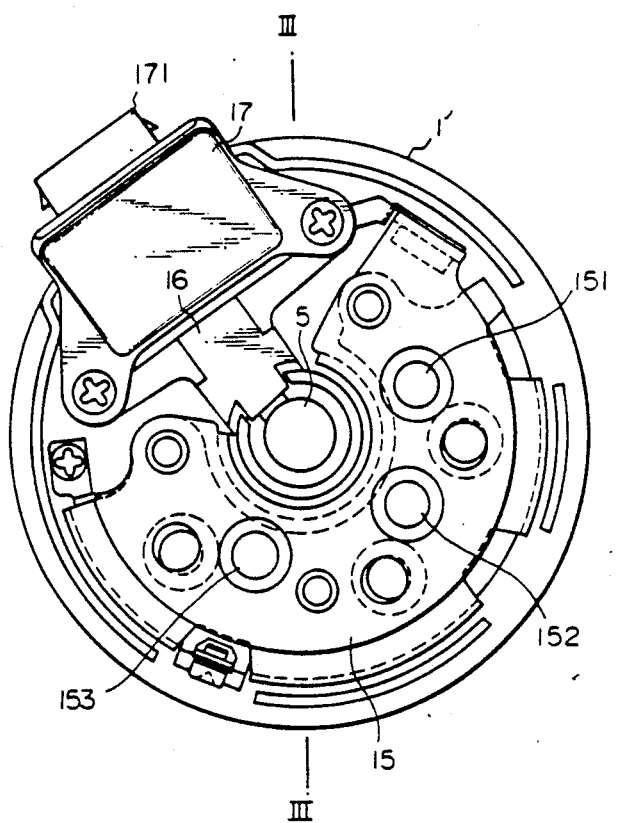
FIG. 2 illustrates a side view of the alternator of FIG. 1 in which the rear cover is removed.
Figure 3:
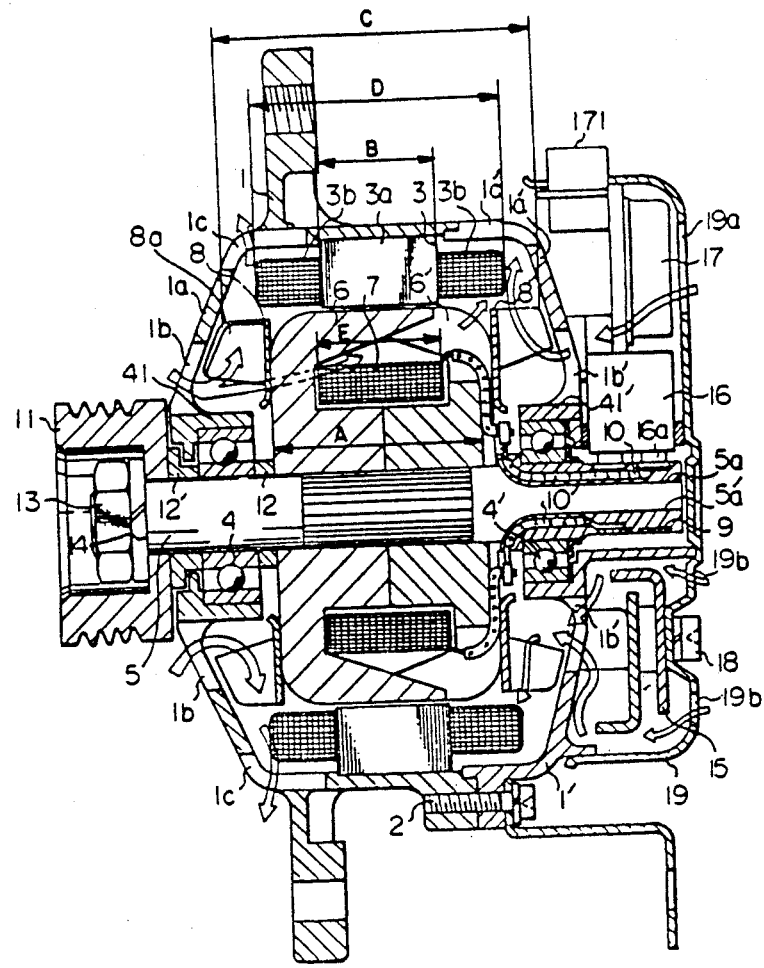
FIG. 3 is a cross-sectional view of the alternator of FIG. 2 as an embodiment of the present invention, taken along line III—III.

The structure of the alternator in accordance with an embodiment of the present invention is illustrated in FIGS. 1, 2 and 3. The housing of the generator consists of a pair of frame pieces 1 and 1' which directly connect with each other at their circular edges to form an area to accommodate the operative emembers of the alternator. The frame pieces 1 and 1' are fixed to each other by through bolts only one of which is illustrated as a through bolt 2 in FIG. 3.

The bearing boxes 41 and 41' are fixed to the inner central portions of the frame pieces 1 and 1' and accomodate the bearings 4, 4' through which a shaft 5 is penetrated. Because the frame pieces 1 and 1' are coupled directly and firmly to each other, the precise positioning of the bearing boxes 41, 41' and the bearings 4, 4' is attained and errors in the positions of the centers of the bearings 4, 4' are minimized, and accordingly the precise support of the shaft 5 is attained. This helps the high speed rotation of the shaft 5 and reduces the vibration during the high speed rotation of the shaft 5.

The axial length of the housing formed by the frame pieces 1 and 1' decreases from the axis portion toward the circumferential portion. Accordingly, the housing has a swollen shape similar to the shape of an egg as illustrated in FIG. 3. This shape is advantageous because of the increased structural strength of the generator.

A core 3a of a stator 3 is fixed directly to the inside of the frame 1. The entire outside surface of the core 3a of the stator 3 contacts the inside surface of the frame 1. Heat generated in the stator core is conducted through said entire outside surface to the frame. This helps the efficient cooling of the stator A stator winding 3b is wound around the stator core 3a.

The rotor core fingers 6 and 6' are offset circumferentially with respect to each other, as is well known to a person skilled in the art. The pole core of the rotor is located inside of the stator 3 and is fixed to the shaft 5. A rotor winding 7 is wound around the pole core of the rotor.

Cooling fans 8 and 8' are fixed to the end surfaces of the pole cores 6 and 6' of the rotor. The diameter of each of the cooling fans 8 and 8' is smaller than the inner diameter of the stator 3. Blades of the cooling fans 8 and 8' extend in outward directions. The number of the blades 8a of the cooling fan 8 is the same as the number of the rotor core fingers 6. The number of the blades of the cooling fan 8' is determined in accordance with the flow rate of the coolant air. The cooling fan 8 is of a mixed flow type having slant blades 8a so as to forward the coolant air to the rotor not only in the radial direction, but also in the axial direction so that the rotor core is sufficiently cooled by the coolant air (The blade 8a is slant in the direction of rotation.) The cooling fan 8' is of a centrifugal type.

The fresh coolant air is drawn through the intake windows 1b and 1b' formed adjacent to the bearing boxes 41 and 41' in the frame pieces 1 and 1'. The heated coolant air is exhausted through the exhaust windows 1c and 1c' formed adjacent to the stator 3 in the frame pieces 1 and 1'.

Slip rings 9 are connected to the rotor winding 7 through conductors 10, 10' arranged in slots 5a, 5a' in the shaft 5. The slip rings 9 are arranged on the shaft 5, adjacent to the position of the bearing 4' and outside of the frame pieces 1, 1'.

A pulley 11 having four grooves is fixed to one end of the shaft 5 by a screw nut 13 and a washer 14. Collars 12 and 12' are inserted between the rotor core 6 and the bearing 4 and between the bearing 4 and the pulley 11. The pulley 11 is driven by an engine through a poly V belt (not shown).

A diode fin 15 carrying diodes, brushes 16a supplying an excitation current to the rotor winding through the slip ring 9 and conductors 10, 10', brush holders 16, and a voltage regulator unit 17 of the hybrid integrated circuit type (so-called the IC type) for controlling the field current of the generator are arranged outside of the frame pieces 1, 1' and are accomodated in a rear cover 19 which is fixed to the frame pieces 1' by bolts 18. Only one of said bolts 18 is illustrated in FIG. 3. The rear cover 19 serves as a protective cover for the above described elements accomodated in the rear cover 19 outside of the frame pieces 1, 1'. Windows 19a and 19b are provided in the rear cover 19 for the cooling of the regulator 17 and the diode fin 15. Diodes 151, 152 and 153 are located in the recesses on the diode fin 15 (FIG. 2). The heat generated in the diodes is effectively dissipated in the coolant air through the diode fin.

An electrical connector 171 is provided adjacent to the regulator 17 to form an electrical connection to a storage battery and the like. Because all of the main static electrical elements, such as diodes, brushes, brush holders, a regulator and an electrical connector are arranged compactly outside of the frame pieces 1, 1' and in the space formed by the rear cover 19, only a small length of the conductors is required for the electrical connections among the main static electrical elements.

In operation, the coolant air drawn through the window 1b cools in sequence the bearing 4 and the stator winding 3b, and the resultant heated coolant air is exhausted through the window 1c. A portion of the coolant air drawn through the window 1b is pushed into the rotor structure through the gaps between the rotor core fingers 6, 6' to cool the rotor winding 7, passes through the stator winding 3b, and is exhausted through the window 1c'.

Simultaneously with the above described cooling, the coolant air drawn through the windows 19a, 19b of the rear cover 19 cools either the regulator 17 or the diode fin 15, and is then drawn into the housing formed by the frame pieces 1 and 1' through the windows 1b'. The coolant air drawn into the housing cools in sequence the bearing 4' and the stator winding 3b and the resultant heated coolant air is exhausted through the window 1c'.

We claim:

1. An alternator for use in a vehicle comprising:
   a housing including a circumferential portion extending between spaced apart axial end portions, each of said axial end portions having a central portion and means defining a plurality of intake ports adjacent said central portion for permitting air passage therethrough, said circumferential portion further including means defining first and second air exhaust ports spaced from each other;
   a stator assembly, including a stator core provided on an inner surface of said circumferential portion at a location between said first and second air exhaust ports, and a stator winding wound around said stator core;
   a rotor assembly, including a rotor shaft, a rotor core fixed to the rotor shaft for rotation therewith and comprising interleaved pole members which define a plurality of angularly separated fingers having axially extending spaces therebetween, and a rotor coil wound around said rotor core;
   bearing means in the central portion of each of said axial end portions for rotatably supporting said rotor shaft;
   a pulley fixed on a first end of said rotor shaft, and driven by said vehicle;
   a diode fin and a voltage regulator disposed round a second end of said rotor shaft;
   a first fan provided on one end surface of said pole members of said rotor on said first end of said rotor shaft, whereby during rotation of the rotor core, said first fan draws air from the exterior of said housing through said intake ports in one of said axial end portions and directs the air radially of the housing past said stator winding and through said first air exhaust ports in said circumferential portion and axially of said housing through said spaces between fingers, and between said rotor coil and said stator core; and
   a second fan provided on the other end surface of said pole members of said rotor on said second end of said rotor shaft, whereby during rotation of the rotor core, said second fan draws air through said intake ports in the other of said axial end portions, said diode fin and said voltage regulator, and directs the air radially of the housing past said stator winding through said second air exhaust ports in said circumferential portion so that said diode fin and said voltage regulator are directly cooled by the air drawn by the second fan.

2. A alternator according to claim 1, wherein said diode fin and said voltage regulator are located outside of said housing.

3. A alternator according to claim 2, further comprising;
   a rear cover for covering said diode fin and said voltage regulator having a thickness less than the thickness of said axial end portion of said housing.

4. A alternator according to claim 1, wherein said pulley has a plurality of grooves for a poly V belt in order to make a diameter of said pulley small, whereby an effective area of said intake ports in said axial end portion which is not hindered by said pulley becomes wide so that said first fan draws much air through said intake ports.

5. A alternator according to claim 4, wherein each of said axial end portions extends obliquely between said central and circumferential portions in such a manner that the axial length of said housing decreases from said central portions towards said circumferential portion.

6. A alternator according to claim 1, wherein the ends of said stator winding are arranged in overlapping relationship with said first and second air exhaust ports respectively.

7. A alternator according to claim 1, wherein said bearing means includes a pair of bearings arranged close to said rotor core so that an outer peripheral edge of said first and second fans is close to the inner surface of said axial side portion of said housing.

* * * * *

UNITED STATES PATENT AND TRADEMARK OFFICE
CERTIFICATE OF CORRECTION

PATENT NO. : 4,926,076

DATED : May 15, 1990

INVENTOR(S) : Takayasu NIMURA and Tsutomu SHIGA

It is certified that error appears in the above-identified patent and that said Letters Patent is hereby corrected as shown below:

Title page, item [30] should read as follows:
-- Foreign Application Priority Data Dec. 14, 1979 [JP]   Japan .................... 54-162439 --

Signed and Sealed this

Thirtieth Day of July, 1991

Attest:

HARRY F. MANBECK, JR.

Attesting Officer

Commissioner of Patents and Trademarks